United States Patent
Gerardi et al.

(10) Patent No.: US 7,727,397 B2
(45) Date of Patent: Jun. 1, 2010

(54) WASTEWATER TREATMENT APPARATUS

(75) Inventors: Michael Gerardi, Linden, PA (US); Henry Holcomb, Williamsport, PA (US); Gene Wagner, Jersey Shore, PA (US)

(73) Assignee: Cromaglass Corporation, Williamsport, PA (US)

( * ) Notice: Subject to any disclaimer, the term of this patent is extended or adjusted under 35 U.S.C. 154(b) by 3 days.

(21) Appl. No.: 12/123,113

(22) Filed: May 19, 2008

(65) Prior Publication Data

US 2009/0283472 A1   Nov. 19, 2009

(51) Int. Cl.
*C02F 3/12* (2006.01)

(52) U.S. Cl. ............... 210/615; 210/626; 210/150; 210/151; 210/195.3

(58) Field of Classification Search .............. 210/615, 210/617, 620, 626, 139, 150, 151, 195.3, 210/532.2
See application file for complete search history.

(56) References Cited

U.S. PATENT DOCUMENTS

| | | | |
|---|---|---|---|
| 3,945,918 A | | 3/1976 | Kirk |
| 3,966,608 A | * | 6/1976 | Mason et al. ............... 210/151 |
| 4,039,539 A | | 8/1977 | Kühlthau |
| 4,070,292 A | * | 1/1978 | Adams .................... 210/195.1 |
| 4,093,539 A | | 6/1978 | Guarino |
| 4,415,454 A | | 11/1983 | Fuchs |
| 4,500,429 A | | 2/1985 | Reimann et al. |
| 4,566,971 A | | 1/1986 | Reimann et al. |
| 4,676,906 A | | 6/1987 | Crawford et al. |
| 4,780,198 A | | 10/1988 | Crawford et al. |
| 4,798,669 A | | 1/1989 | Bachhofer et al. |
| 4,810,385 A | * | 3/1989 | Hater et al. ................. 210/150 |
| 4,925,564 A | * | 5/1990 | Francis ....................... 210/615 |
| 5,126,042 A | | 6/1992 | Malone |
| 5,178,755 A | | 1/1993 | LaCrosse |
| 5,207,993 A | | 5/1993 | Burris |
| 5,221,470 A | * | 6/1993 | McKinney .................. 210/151 |
| 5,268,094 A | | 12/1993 | Long |
| 5,273,664 A | | 12/1993 | Schulz |
| 5,466,374 A | | 11/1995 | Bachhofer et al. |
| 5,484,524 A | * | 1/1996 | MacLaren et al. .......... 210/151 |
| 5,545,327 A | | 8/1996 | Volland |
| 5,609,754 A | | 3/1997 | Stuth |

(Continued)

OTHER PUBLICATIONS

Carrera, J.,J.A. Baeza, T. Vicent, and J. Lafuente. (2003). "Biological Nitrogen Removal of High-Strength Ammonium Industrial Wastewater with Two-Sludge System." Water Research 37: 4211-4221.

(Continued)

*Primary Examiner*—Christopher Upton
(74) *Attorney, Agent, or Firm*—St. Onge Steward Johnston & Reens LLC

(57) ABSTRACT

A wastewater treatment apparatus having a fixed film media apparatus having insertable high surface area polymer cartridges providing growth surfaces for autotrophic or heterotrophic bacteria and a protective shielding surface which isolates the biofilm from turbulence within the wastewater treatment system. A method of placement of said media apparatus within the aeration and/or clarifier section of the wastewater treatment apparatus.

28 Claims, 2 Drawing Sheets

U.S. PATENT DOCUMENTS

| | | | |
|---|---|---|---|
| 5,911,877 A * | 6/1999 | Perez et al. | 210/150 |
| 6,207,047 B1 | 3/2001 | Gothreaux | |
| 6,331,249 B1 * | 12/2001 | Nelson et al. | 210/151 |
| 6,942,788 B1 | 9/2005 | Cox et al. | |
| 7,132,050 B2 * | 11/2006 | Davis et al. | 210/615 |
| 7,452,468 B2 * | 11/2008 | Smith | 210/617 |
| 2006/0180546 A1 * | 8/2006 | Stuth et al. | 210/617 |
| 2008/0017574 A1 * | 1/2008 | Lenger et al. | 210/615 |

OTHER PUBLICATIONS

Metcalf & Eddy. Wastewater Engineering Treatment and Reuse. 4th ed. McGraw-Hill, 2003. 60-61, 749-760.

Bitton, G..Wastewater Microbiology. 3rd ed. Hoboken: John Wiley & Sons, Inc., 2005. 79-88.

Viessman Jr., W., and M.J. Hammer. Water Supply and Pollution Control. 7th ed. Upper Saddle River: Pearson Prentice Hall, 2005. 312.

* cited by examiner

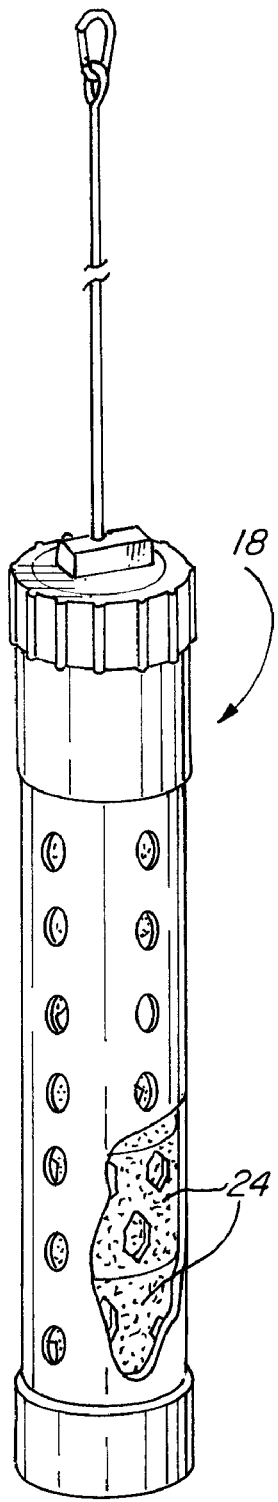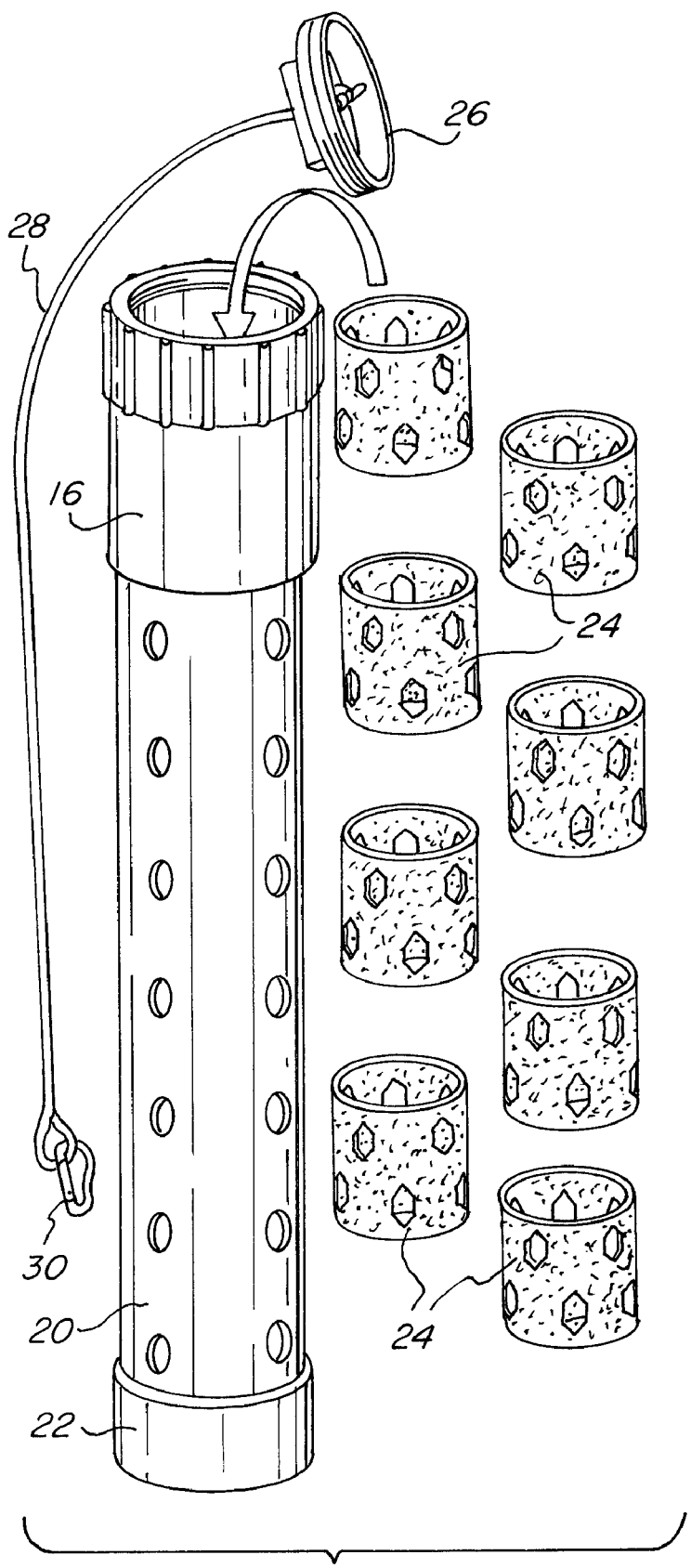
FIG. 2A
FIG. 2B

WASTEWATER TREATMENT APPARATUS

FIELD OF THE INVENTION

The present invention relates to a wastewater treatment apparatus, and more specifically to a wastewater treatment apparatus including a removable fixed film media apparatus having a plurality of surfaces upon which biofilms may grow and a protective barrier which shields said surfaces from turbulence.

The present invention further pertains to a novel fixed film media for use in biological wastewater treatment and method for the use of said media in nitrogen removal from contaminated water. The present invention more particularly pertains to an efficient, economical and compact apparatus and method for treating a fluid which protects the biological film from damage and sloughing which commonly occurs as a result of turbulence.

BACKGROUND OF THE INVENTION

The purpose of wastewater treatment is generally to remove from the wastewater enough solids to permit the remainder to be discharged to a receiving water source (river, holding pond, urban drainage etc.) without interfering with its proper use and often, within analytical guidelines set by a controlling agency. Wastewater may be treated using physical, chemical or biological processes or a combination of these. The preliminary treatment regimen in most wastewater treatment processes involves a screening procedure to remove coarse materials (paper, sticks, cans etc.) followed by the removal of heavy inorganic particles (sand, pebbles, etc.) by a settlement process.

One common chemical treatment involves the use of ozone. Consider background patents which illustrate, for example, the large number of water purification ozonization techniques such as in U.S. Pat. No. 5,178,755, issued to LaCrosse, that discloses a method for treating wastewater, that has been enhanced by treatment with ultra-violet light and with ozone. In this system, a large amount of ozone is generated and inserted at several points in the effluent flow, including insertion in each of the three clarifiers. This system utilizes large quantities of ozone at a relatively high cost and low efficiency. Furthermore, in this system; water is continually re-circulated based upon a timer and the system does not automatically respond to changes in the influent quality or discharge water from the system based upon water quality parameters.

Another example, U.S. Pat. No. 4,798,669, issued to Bachhofer, et al., discloses an apparatus for mixing the ozone with water which is then trickled over packing material to entrain the ozone within the water being treated. The water is re-circulated through a return branch and mixes with the incoming contaminant water before it enters the treatment system. The re-circulation step is not automatic or self-adjusting based upon water quality parameters. Further ozone contact with the contaminants, after filtration of the effluent, is made by inserting recaptured gas into the effluent stream prior to the effluent being treated by a packed column which trickles the effluent over a packing material. As agitation reduces the capability of water to retain ozone, trickling over packing material may be detrimental to the efficient retention of ozone within the effluent for effective contact with contaminants. See also, U.S. Pat. No. 5,466,374 to Bachhofer et al., U.S. Pat. No. 5,207,993 to Burris, U.S. Pat. No. 3,945,918, issued to Kirk; and U.S. Pat. No. 5,273,664, issued to Schulz for additional configurations used for ozone treatment.

Probably the most commonly used chemical process is chlorine treatment. Like ozone, chlorine is a strong oxidizing agent used to kill bacteria and to slow down the decomposition of the wastewater. Even in systems involving biological treatment of wastewater, chlorine is often added in a penultimate step prior to discharge in order to remove specific organisms which are responsible for infectious diseases including, for example, *Shigella Dysenteriae, Salmonella, Escherichia Coli, Klebsiella Pneumoniae, Vibrio Cholerae, Giardia* spp., *Cryptosporidium* spp. and *Entamoeba Histolytica*. Residual chlorine is neutralized with sulfur dioxide before final discharge.

Nitrogen removal from wastewater can be accomplished through various chemical, physical and biological processes. In contrast to chemical treatments which tend to destroy microorganisms, biological treatment methods use microorganisms, mostly bacteria, in the biological decomposition of wastewaters to stable end products. More microorganisms are produced, and a portion of the waste is converted into carbon dioxide, water and other end products of microbial metabolism.

Nitrogen and nitrogenous compounds are often the focal point for biological wastewater treatment. Biological processes are the most common methods encountered in wastewater treatment due to the low capital costs, low operating costs, and high rates of nitrogen removal. Although nitrogen can be found in wastewater as nitrogenous organic compounds such as proteins and amino acids (Metcalf et al 2003), nitrogen is most commonly found in the forms of ammonia ($NH_3$), ammonium ($NH_4^+$), nitrite ($NO_2^-$), and nitrate ($NO_3^-$). Biological nitrogen removal is achieved by two processes, nitrification and denitrification. The first step in nitrogen removal is biological nitrification, which is the oxidation of ammonium ($NH_4+$) to nitrite ($NO_2-$) and then nitrite is further oxidized to nitrate ($NO_3-$). The second step in nitrogen removal is biological denitrification. Denitrification is a multi-step process that reduces nitrate to nitrogen gas ($N_2$). Nitrogen gas is then released into the atmosphere and thus completes the biological nitrogen removal process from wastewater.

Soluble organic nitrogenous compounds are quickly converted to ammonium through a biological-mediated process. Ammonium is the chemical of interest when nitrogen removal is required in a treatment process. There are many different forms of human activity that generate wastewater with large quantities of ammonium: petrochemical, pharmaceutical, fertilizer and food industries and leachates produced by urban solid waste disposal sites and waste from their agricultural equivalents (pig farms etc.). (Carrera, et al 2003). When present in water, ammonia will dissociate into both ammonium ions ($NH_4^+$) and un-ionized ammonia ($NH_3$).

$$NH_3 + H_2O \leftarrow\!\!-\!\!\rightarrow NH_4^+ + OH^- \qquad \text{Equation 1}$$

The concentration of un-ionized ammonia increase with increasing pH and increasing temperature (Viessman, et al., 2005). Wastewater is slightly alkaline with a pH in the range of 7.0-8.0; therefore ammonium is the dominant species in wastewater.

To remove potentially toxic nitrogenous compounds from wastewater, biological nutrient removal (BNR) is the most common method utilized. BNR for nitrogen is a two step activated sludge process that converts ammonium to nitrogen gas through nitrification and denitrification. Nitrification is the biological oxidation of ammonia to nitrate. It is an aerobic, two step process which proceeds as a result of metabolism by autotrophic, nitrogen-oxidative bacteria species known as *Nitrosomas* and *Nitrobacter*. Autotrophic bacteria require oxygen both for respiration and chemical oxidation purposes. As their sources of energy, they utilize inorganic compounds and require either carbon dioxide, bicarbonate or carbonate for their carbon source used in cell synthesis.

Nitrification can be summarized by the following three equations:

$$NH_4^+ + 1.5O_2 \rightarrow NO_2^- + 2H^+ + H_2O + \text{biomass energy} \quad \text{Equation 2}$$

$$NO_2^- + 0.5O_2 \rightarrow NO_3^- + \text{biomass energy} \quad \text{Equation 3}$$

$$NH_4^+ + 2.0O_2 \rightarrow NO_3^- + 2H^+ + H_2O + \text{biomass energy} \quad \text{Equation 4}$$

The ammonia oxidation shown in Equation 2 is accomplished by the autotroph *Nitrosomas*. Ammonia serves as an electron donor while molecular oxygen serves as the electron acceptor. Ammonia is oxidized to nitrite ($NO_2$—) in a stepwise process via hydroxylamine ($NH_2OH$) through the use of the enzyme ammonia monoxygenase as seen in Equation 5. Equation 6 illustrates the enzyme hydroxylamine oxidoreductase converting hydroxylamine to nitrite.

$$NH_3 + O_2 + 2H^+ \rightarrow NH_2OH + H_2O \quad \text{Equation 5}$$

$$NH_2OH + H_2O \rightarrow NO_2^- + 5H^+ \quad \text{Equation 6}$$

In Equation 3, nitrite is further oxidized to nitrate. This process is carried out by the autotrophic nitrite oxidizing bacteria known as *Nitrobacter*. *Nitrobacter* can grow heterotrophically in the presence of acetate, formate or pyruvate and will utilize the enzyme nitrite oxidoreductase for nitrite reduction as seen in Equation 7. (Bitton, 2005).

$$NO_2 - + 0.5O_2 \rightarrow NO_3 - \quad \text{Equation 7}$$

Nitrification is an energy yielding process and the energy generated is used to assimilate elementary carbon sources like carbon dioxide, bicarbonate and carbonate to meet the carbon requirements for reproduction of the nitrifying bacteria. Being an aerobic process, the oxygen requirement is 4.6 mg $O_2$/mg ammonia for complete oxidation to nitrate. Sufficient alkalinity is also needed as a buffering agent for the nitrous acid, $HNO^2$ ($H^+ + NO2^-$) produced during the nitrification and is consumed at a rate of 15.7 kg $CaCO_3$/kg $NH_3$ oxidized.

Presently there exist a number of types of water purification devices designed to remove nitrogen from wastewater through biological processes. A traditional means involves treating the wastewater with activated sludge. Activated sludge is defined as sewage mixed with bacteria and protozoa that thrive in and multiply in it and lead to its oxidation. Activation reduces the organic pollution that raw sewage otherwise would impose on a body of water to which it is discharged.

Biological nitrogen removal is achieved through the use of either suspended growth treatment or attached growth treatment. Suspended growth is the utilization of a suspended activated sludge containing aerobic autotrophic bacteria for nitrification in an aerated tank and facultative heterotrophic bacteria for denitrification in an anoxic setting. Attached growth is the use of similar bacteria as in a suspended growth reactor, but the bacteria forms a layer of growth, known as a biofilm or fixed film, on a specific fixed film media. Submerging attached growth media in a suspended growth aeration tank, thus combining these technologies, is commonly known as an integrated fixed film activated sludge system (IFAS).

Systems utilizing submerged growth media include floating media and fixed media. Examples of floating media include plastic balls (Stuth U.S. Pat. No. 5,609,754), polyurethane foams (Reimann et al U.S. Pat. No. 4,500,429, Fuchs U.S. Pat. No. 4,415,454 and Reimann U.S. Pat. No. 4,566,971 and polyethylene pellets (Malone U.S. Pat. No. 5,126,042).

Fixed media systems are more varied. Simple systems have been described which have plain flat surfaces. Systems which are designed for having larger exposed surface areas include packed corrugated panels (Volland U.S. Pat. No. 5,545,327, Cox U.S. Pat. No. 6,942,788) or pipes. These are generally aerated systems which use variously positioned air release mechanisms to drive and direct the flow through the media configuration. Another configuration described by Gothreaux (U.S. Pat. No. 6,207,047) involves a porous grid as a support media for bacterial growth and is purported to allow for larger volume wastewater treatment A number of anaerobic treatment systems have been described which involve a fixed medium which forms a packed bed through which the wastewater is passed. Such systems suffer from the disadvantage of gradually reducing flow rates due to accumulation of solids within the bed. Crawford et al (U.S. Pat. No. 4,676,906 and U.S. Pat. No. 4,780,198) describe a hybrid high rate process which uses a sludge blanket with a filter bed which retains biosolids within the digestor. Aerated fluidized bed or suspended bed systems have also been described (Reimann U.S. Pat. No. 4,566,971).

In what might best be described as a moving fixed media system, U.S. Pat. No. 4,093,539 to Guarino describes a system wherein the media is comprised of a partially submerged rotating contactor located within an aeration tank. The rotation of the media is driven by a supplemental air source.

A major disadvantage encountered with each of the fixed media systems described within the prior art is the exposure of the biofilms to turbulence within the wastewater treatment apparatus. In fact, a number of these systems were designed specifically to expose the media surfaces to turbulence as demonstrated by the rotating media described by Guarino and those wherein aeration is directed over the media such as that described by Volland (U.S. Pat. No. 5,545,327), Cox (U.S. Pat. No. 6,942,788) and Reimann (U.S. Pat. No. 4,566,971). Both forced motion or the bubbling of gases are sources of extreme turbulence. Even in systems where turbulence is not designed-in, exposed media surfaces are subject to fluid motions within the tank due to the pumps used for intertank wastewater exchange. Such turbulence can adversely affect the growth and ultimate thickness of the biofilms by causing these delicate structures to slough off. This loss of biofilms through sloughing off lowers the overall efficiency of the wastewater processing apparatus and creates a further issue of removal of the resulting solids from the wastewater. Since sloughing of the biofilms from fixed film media affects the quality of the effluent, the placement of such systems is generally limited to the aeration section of the wastewater treatment apparatus (4 in FIG. 1). Placement of unprotected media within the clarifier section (6 in FIG. 1) is greatly restricted since, for effluent arising from this section, quality is paramount. In as much as the art consists of various types of fixed film media configurations, it can be appreciated that there is a continuing need for and interest in improvements to these purification systems and their configurations, and in this respect, the present invention addresses these needs and interests.

SUMMARY OF THE INVENTION

Therefore, the principal object of this invention is to provide a new and improved wastewater treatment system that overcomes the aforementioned inadequacies of the prior art devices and provides an improvement that is a significant contribution to the advancement of the purification art.

An additional objective is to provide a compact and moveable purification apparatus that may be easily incorporated into any existing water purification system containing other treatment units such as filters (including sand, carbon, or multimedia), pumps, aeration tanks, coagulation/flocculation basins, sedimentation basins, clarification tanks, storage tanks, or any combination thereof.

Yet a further objective is to provide a new method of placement of the claimed the fixed film apparatus within the terminal sections of the larger wastewater treatment apparatus. This newly described placement of the fixed film media apparatus permits biopurification to occur even within the terminal clarifier chamber resulting in a superiorly purified outlet water stream.

These and other objectives are achieved by providing a wastewater treatment apparatus including an aeration section for receiving and containing wastewater, a mixing element operable within the aeration section for mixing the wastewater, a clarifier section for settling then wastewater to separate any settleable solids, a pump for transferring the wastewater from the aeration section to the clarifier section and at least one fixed film media apparatus comprising a plurality of surfaces upon which biofilms may grow and a protective barrier which shields the surfaces from turbulence.

In some embodiments, the protective barrier is semi-permeable and/or includes a plurality of holes. In some embodiments, the protective barrier comprises a polymer cylinder including polymer end caps. The apparatus may also include two or more cartridges removably inserted with the cylinder, wherein the two or more cartridges comprise the plurality of surfaces.

Other objectives are achieved by providing a fixed film media apparatus comprising a cylinder including a plurality of holes for passing wastewater, one or more cartridges removably inserted within the cylinder, each including one or more surfaces upon which a biofilm may grow, and wherein the cylinder shields the surfaces from turbulence in the wastewater. In some embodiments, each of the cartridges is substantially cylindrical and includes two or more holes.

Further provided is a method of treating wastewater comprising the steps of receiving wastewater into an aeration section of a wastewater treatment apparatus, mixing the wastewater in the aeration section, receiving at least a portion of the wastewater through a protective barrier of at least one fixed film media apparatus in the aeration section, wherein the fixed film media apparatus includes two or more cartridges, and treating the portion of the wastewater with biofilm attached to surfaces of the two or more cartridges. The fixed film media apparatus includes a plurality of holes, wherein the portion of the wastewater is received and expelled via the plurality of holes.

The foregoing has outlined some of the pertinent objects of the invention. These objects should be construed to be merely illustrative of some of the more prominent features and applications of the intended invention. Many other beneficial results can be obtained by applying the disclosed invention in a different manner or by modifying the invention within the scope of the disclosure. Accordingly, other objects and a more comprehensive understanding of the invention may be obtained by referring to the summary of the invention, and the detailed description of the preferred embodiment in addition to the scope of the invention defined by the claims taken in conjunction with the accompanying drawings.

BRIEF DESCRIPTION OF THE DRAWINGS

For a more succinct understanding of the nature and objects of the present invention, reference should be directed to the following detailed description taken in connection with the accompanying drawings in which:

FIG. 2a is an intact view of the fixed film media apparatus.

FIG. 2b is an exploded view of the fixed film media apparatus.

DETAILED DESCRIPTION OF THE INVENTION

Figure 1:
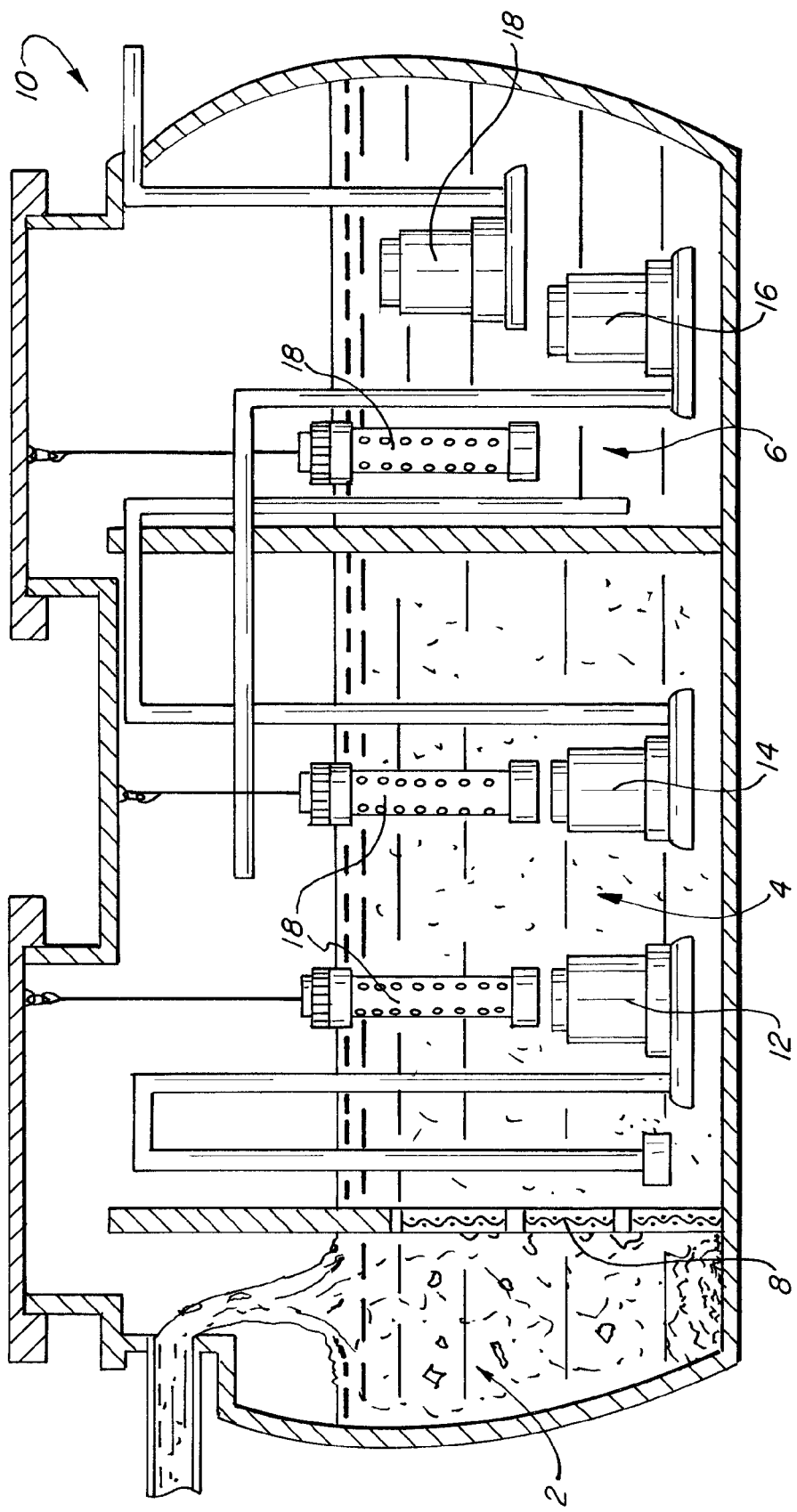
FIG. 1 is a Schematic of the wastewater treatment apparatus with identification labels.

FIG. 1 shows a wastewater treatment batch reactor. Flow enters the solids retention section (2) that is separated by a non-corrosive screen (8). Large solids are retained behind the screen and organic solids are broken up by turbulence created with mixing liquor being forced through the screen by a submersible aeration pump (12) or equivalent mixing element. Liquid and small organic solids pass through the screen into the continuing aeration section (4). Air and mixing are provided by submersible pumps with aspirators that receive air through pipe intakes from the atmosphere (not shown). Valves may be present on said intakes to control the intake of air into the system, the opening and closing of said valves may be controlled by a timing elements. A system to override said timing elements may also be present to allow for manual control of said valves.

The fixed film media apparatus of this invention is shown (18). Fluids flow into the apparatus encountering an actively growing biofilm within. The enclosed biofilm is protected from the shear forces caused by turbulence by a protective barrier. The treated mixed liquor is transferred via pump (14) to the clarifier section (6). Within the clarifier section solids separation occurs under quiescent conditions. After settling, effluent is pumped out of the clarifier for discharge via pump (18) and sludge may be pumped back into the aeration section (4) via pump (16).

The prior art discloses many examples of fixed film media exposed to wastewater within the aeration sections of batch processors or their equivalent. The turbulence within the aeration chamber places limits on the growth of biofilms due to the shear forces to which such films are exposed within said chamber. However, the present invention protects the biofilms from said shear forces by placing an enclosing barrier around the fixed film media. Additionally, the fixed film media of the present invention is able to be moved within the aeration chamber and secured by a rope or a chain or the like in order to allow for optimization of protection from turbulence within the aeration chamber. The fixed film media apparatus requires minimal installation and may be used to fulfill the clean and safe water needs of any home, hotel, restaurant, hospital, light industry, commercial business, apartment complex or small city.

Furthermore, the inventors have found that, unlike traditional fixed film surfaces, the protective barrier of the fixed film media apparatus of the present invention allows the apparatus to be placed within the clarifier section of a wastewater treatment batch reactor to allow for further water purification through additional digestion of organic material. Alternatively, a fixed film media apparatus of the present invention may be inoculated with a denitrification species such as Pseudomonas or Alcaligenes to allow for reduction of the nitrate (produced in the aeration tank) to nitrogen gas.

FIGS. 2A and 2B display a complete and an exploded view of the fixed film media apparatus of the present invention. In FIG. 2a, the protective barrier is portrayed as a cylindrical pipe. This configuration should be construed as merely illustrative of one possible configuration of a protective barrier. Those with skill in the art would readily see other possible configurations which would also fulfill the aims of the present invention.

Within FIG. 2B are shown the polymeric fixed film media cartridges (24) upon which the biofilms are grown. When the protective barrier is a cylindrical pipe, the preferred configuration for said cartridges is a cylinder with outside diameter less than the inside diameter of the protective barrier pipe. The cartridges may be open cylinders, or alternatively, open cylinders with cross supports to allow for greater surface area for film growth. Said cartridges may also have a plurality of holes along their length to allow for fluid flow. Protective barrier (20), shown in FIG. 2B as a cylindrical pipe is covered at the lower end by a static endcap (22) and at the upper end by a removable endcap (16). In order to allow access to the interior of the apparatus and loading of the cartridges (24), endcap (16) may be opened by unscrewing cover (26). Alternative arrangements for accessing the interior of the fixed film media apparatus would include removal of fasteners holding cover (26) in place or having cover (26) as a secured hinged cover. A rot-resistant rope (28) or corrosion resistant chain with an attached hook or carabineer (30) allows for suspension of the assembled apparatus (18, FIG. 2A) within a wastewater treatment batch reactor.

In one embodiment, the wastewater processing apparatus has a fixed film media apparatus which is comprised of a protective barrier, said protective barrier being a polymer cylinder with a diameter of from about 1 inch to about 12 inches, length of from about 12 inches to about 72 inches, capped on both ends by polymer endcaps and made semi-permeable to wastewater and its suspended contents by having a plurality of holes along its length, said holes being of a diameter of from about 0.166 inches to about 3.000 inches; and containing between 1 and 24 polymer cartridges; and having an attached rot-resistant rope or corrosion-resistant chain of between 24 and 72 inches in length.

In second embodiment, the wastewater processing apparatus has a fixed film media apparatus which is comprised of a protective barrier, said protective barrier being a polyvinylchloride cylinder with a diameter of from about 1 inch to about 12 inches, length of from about 12 inches to about 72 inches, capped on both ends by polymer endcaps and made semi-permeable to wastewater and its suspended contents by having a plurality of holes along its length, said holes being of a diameter of from about 0.166 inches to about 3.000 inches; and containing between 1 and 24 polymer cartridges; and having an attached rot-resistant rope or corrosion-resistant chain of between 24 and 72 inches in length.

In a further embodiment, the wastewater processing apparatus has a fixed film media apparatus which is comprised of a protective barrier, said protective barrier being a polyvinylchloride cylinder with a diameter of from about 1 inch to about 12 inches, length of from about 12 inches to about 72 inches, capped on both ends by polymer endcaps and made semi-permeable to wastewater and its suspended contents by having a plurality of holes along its length, said holes being of a diameter of from about 0.50 inches to about 3.000 inches; and containing between 1 and 24 polypropylene cartridges; and having an attached rot-resistant rope or corrosion-resistant chain of between 24 and 72 inches in length.

In a preferred embodiment, the wastewater processing apparatus has a fixed film media apparatus which is comprised of a protective barrier, said protective barrier being a polyvinylchloride cylinder with a diameter of from about 3 inch to about 12 inches, length of from about 18 inches to about 72 inches, capped on both ends by polymer endcaps and made semi-permeable to wastewater and its suspended contents by having a plurality of holes along its length, said holes being of a diameter of from about 0.50 inches to about 3.000 inches; and containing between 1 and 24 polypropylene cartridges; and having an attached rot-resistant rope or corrosion-resistant chain of between 24 and 72 inches in length.

Obviously, many modifications and variations of the invention as hereafter set forth will occur to those skilled in the art, and it is intended to cover in the appended claims all such modifications and variations as fall within the true spirit and scope of the invention.

What is claimed is:

1. A wastewater treatment apparatus, comprising:
   an aeration section for receiving and containing wastewater;
   a mixing element operable within the aeration section for mixing the wastewater;
   a clarifier section for settling the wastewater to separate any settleable solids;
   a first pump for transferring the wastewater from the aeration section to the clarifier section; and
   at least one fixed film media apparatus comprising a cylindrical pipe including one or more at least partially open substantially cylindrical cartridges slideably fit within said cylindrical pipe, said cartridges having surfaces upon which biofilms may grow, wherein said cylindrical pipe provides a protective barrier which shields said surfaces from turbulence.

2. The wastewater treatment apparatus of claim 1, wherein said protective barrier of said fixed film media apparatus completely encloses said surfaces upon which biofilms may grow.

3. The wastewater treatment apparatus of claim 1, wherein said protective barrier of said fixed film media apparatus is semi-permeable to the wastewater.

4. The wastewater treatment apparatus according to claim 3, wherein said protective barrier includes a plurality of holes.

5. The wastewater processing apparatus of claim 1, wherein said cylindrical pipe is a polymer cylinder including, a polymer endcap on each end, wherein said cylindrical pipe is made semi-permeable to wastewater and its suspended contents by having a plurality of holes along its length.

6. The wastewater processing apparatus of claim 5, wherein said fixed film media apparatus includes two or more of the cartridges removably inserted with the cylinder.

7. The fixed film media apparatus according to claim 6, wherein each of said cartridges includes two or more holes.

8. The wastewater processing apparatus according to claim 5, wherein the cylindrical pipe has a diameter of from about 1 inch to about 12 inches and a length of from about 12 inches to about 72 inches, and wherein said holes have a diameter of from about 0.1 inches to about 3 inches.

9. The wastewater processing apparatus of claim 5, wherein the polymer materials from which said cylindrical pipe and said endcaps of which said fixed film media apparatus are constructed are independently chosen from polyvinyl chloride (PVC), polypropylene (PP), high or low density polyethylene (HDPE or LDPE), or polyethylene terephthalate (PET or PETE).

10. The wastewater treatment apparatus according to claim 1, wherein said fixed film media apparatus is located in one of said aeration section and said clarifier section.

11. The wastewater treatment apparatus according to claim 1, wherein said at least one fixed film media apparatus includes at least one first fixed film media apparatus in said aeration section and at least one second fixed film media apparatus in said clarifier section.

12. The wastewater treatment apparatus according to claim 1, further comprising:
  a second pump for returning any settled solids from the clarifier section back to the aeration section; and
  a third pump for directing supernatant effluent out of the clarifier section.

13. The wastewater processing apparatus of claim 1, wherein said cartridges are polymer cartridges, said polymer being chosen from the group consisting of polyvinyl chloride (PVC), polypropylene (PP), high or low density polyethylene (HDPE or LDPE), polyethylene terephthalate (PET or PETE), polystyrene (PS) or polyurethane.

14. The wastewater processing apparatus of claim 1, wherein said fixed film media apparatus includes at least one of a rope or a chain for suspending the apparatus in the wastewater.

15. The wastewater processing apparatus of claim 1, wherein said cylindrical pipe is constructed of polyvinyl chloride pipe of length about 12 to about 72 inches and diameter of from about 1 to about 12 inches and a plurality of holes along its length said holes being of a diameter of from about 0.1 inches to about 3 inches; and containing between 1 and 24 polypropylene cartridges; and having an attached rot-resistant rope or corrosion resistant chain of between 24 and 72 inches in length.

16. The wastewater treatment apparatus according to claim 1, further comprising;
  an air inlet connected with the mixing element for mixing air with the wastewater in the aeration section;
  a valve to open and close said air inlet; and
  a timing element for moving said valve to alternately open said air inlet for mixing with air and close said air inlet for mixing without further addition of air to convert any ammonia in the wastewater to nitrogen.

17. A fixed film media apparatus, comprising:
  a cylindrical pipe including a plurality of holes for passing wastewater;
  one or more at least partially open substantially cylindrical cartridges slideably fit within said cylindrical pipe, each of said cartridges including one or more surfaces upon which a biofilm may grow and two or more holes through said surfaces; and
  wherein said cylindrical pipe shields said surfaces from turbulence in the wastewater.

18. The fixed film media apparatus according to claim 17, further comprising:
  an end cap on each end of said cylinder.

19. The fixed film media apparatus according to claim 18, wherein each of the cylinder and said end caps comprise a polymer material.

20. The fixed film media apparatus according to claim 17, wherein said one or more cartridges includes at least four of said cartridges.

21. The fixed film media apparatus of claim 17, wherein said cylinder has a length of about 12 inches to about 72 inches and diameter of about 1 inches to about 12 inches, and wherein the plurality of holes have a diameter of about 0.1 inches to about 3 inches.

22. The fixed film media apparatus according to claim 17, further comprising:
  at least one of a rope or chain for suspending the fixed film media apparatus in the wastewater.

23. The fixed film media apparatus according to claim 17, wherein each of said cartridges has an outside diameter less than an inside diameter of said cylinder.

24. A method of treating wastewater, comprising the steps of:
  receiving wastewater into an aeration section of a wastewater treatment apparatus;
  mixing the wastewater in the aeration section;
  receiving at least a portion of the wastewater through a protective barrier of at least one fixed film media apparatus in the aeration section, wherein the fixed film media apparatus comprises a cylindrical pipe including two or more at least partially open substantially cylindrical cartridges slideably fit within said cylindrical pipe; and
  treating the portion of the wastewater with biofilm attached to surfaces of the two or more cartridges.

25. The method according to claim 24, wherein said fixed film media apparatus includes a plurality of holes, wherein the portion of the wastewater is received and expelled via the plurality of holes.

26. The method according to claim 24, further comprising the step of:
  pumping the wastewater from the aeration section to a clarifier section for settling the wastewater.

27. The method according to claim 24, wherein the wastewater is received in the aeration section via a screen between the aeration section and a solid retention section of the wastewater treatment apparatus.

28. The method according to claim 24, wherein the biofilm is circumscribed by the protective barrier.

* * * * *